Figure 1:
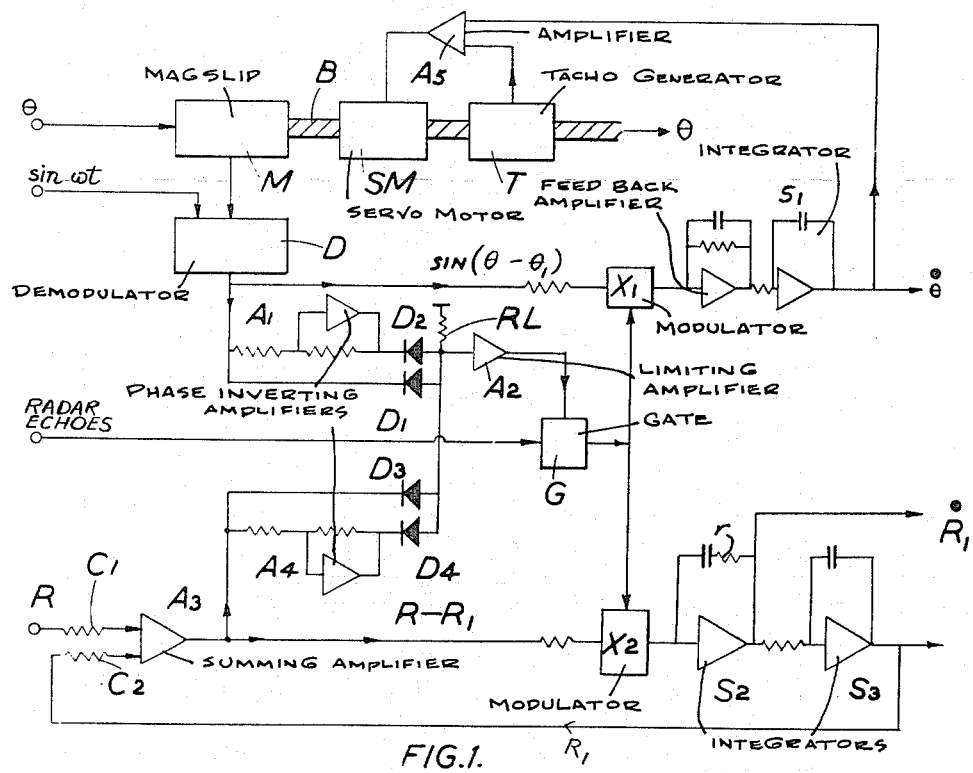

Dec. 30, 1958  E. L. C. WHITE  2,866,966
AUTOMATIC TRACKING CIRCUITS
Filed March 2, 1954

INVENTOR
E. L. C. White
BY
ATTORNEYS

United States Patent Office 2,866,966
Patented Dec. 30, 1958

2,866,966

AUTOMATIC TRACKING CIRCUITS

Eric Lawrence Casling White, Iver, England, assignor to Electric & Musical Industries Limited, Hayes, Middlesex, England, a company of Great Britain Application March 2, 1954, Serial No. 413,579

Claims priority, application Great Britain February 21, 1953

3 Claims. (Cl. 343—7.3)

This invention relates to automatic tracking circuits for radar and to pulse generating apparatus suitable for use therein.

In radar installations there may be a need to provide a considerable number of automatic tracking circuits and therefore simplicity and economy of components in such circuits are a primary requirement. The operation of a known form of automatic tracking circuit involves the process of defining a window which encloses the echo from the target, predicting the required position of the window at a discrete time in the future, generating gating pulses corresponding to the predicted window on a time scale determined by the scanning constants of the radar installation, admitting the echo under the control of said gating pulses to an error signal generator, and employing the error signal for predicting the next position of the window. It is natural for an automatic tracking circuit to work in polar co-ordinates but this has the disadvantage, as compared with working in Cartesian co-ordinates, that the channels in the tracking circuit for dealing with the different co-ordinates cannot be alike. On the other hand identity or substantial identity in the channels for the different co-ordinates is clearly desirable from the point of view of sub-unit construction.

An object of the present invention is to provide apparatus for generating pulses having a predetermined timing which can be employed in substantially identical form in the different co-ordinate channels of a radar automatic tracking circuit which employs polar co-ordinates.

According to one aspect of the present invention there is provided apparatus for generating pulses having predetermined timing comprising means for generating an electrical waveform, means for deriving the inverse of said first electrical waveform, and means for producing a further waveform having a cusp corresponding to the intersection of said first waveform and its inverse, whereby said further waveform comprises a pulse enclosing the intersection of the two waveforms.

According to a preferred form of the present invention, especially applicable to the generation of gating pulses for a radar automatic tracking circuit, there is provided apparatus for generating a position-defining pulse or series of pulses comprising means for generating a first electrical waveform which passes through a reference value at times representing one co-ordinate of a position, means for generating a second electrical waveform which passes through a reference value at times representing another coordinate of said position, and means for deriving a further electrical waveform which follows the greater of the two instantaneous moduli of said first and second waveforms (taken about the reference values) and therefore comprises the desired pulse or series of pulses.

An automatic tracking circuit for radar incorporating apparatus in accordance with the preceding paragraph may be of such a construction that said pulse or series of pulses is employed to gate a radar echo to two modulators in which said echo is caused to modulate, respectively, said first and second waveforms to produce error signals, and means are provided for determining the times of subsequent reference value intersections of said waveforms in dependence upon said error signals so that a subsequent pulse or series of pulses is produced defining a predicted position of the echo. It will be appreciated that when the radar echo is caused to modulate the two waveforms the sign and magnitude of the modulated output will represent the displacement of the echo from the reference value of the respective waveworms and therefore the amount by which the corresponding co-ordinate of the echo is off-centre with respect to the window defined by the gating pulses. Linear modulation by the echo of the periodic waveforms is theoretically desirable but is not in practice necessary and adequate results can be obtained if each echo merely gates the respective waveforms to the error discriminating means. Therefore, this qualification is implied when reference is made herein and in the claims to modulation of the periodic waveforms by the echo.

When the invention is applied to automatic tracking circuits for radar one of the periodic electrical waveforms may be $\sin(\theta-\theta_1)$, where $\theta$ is the bearing angle of the radar beam and $\theta_1$ is the predicted azimuth of the echo and the other of said waveforms may represent $R-R_1$ where R is the range scan of the radar and $R_1$ is the predicted range of the echo. Nevertheless, while the invention is especially suitable for application to radar automatic tracking circuits which employ polar co-ordinates it will be appreciated that the invention may also be applied where different co-ordinates are use.

Figure 2:
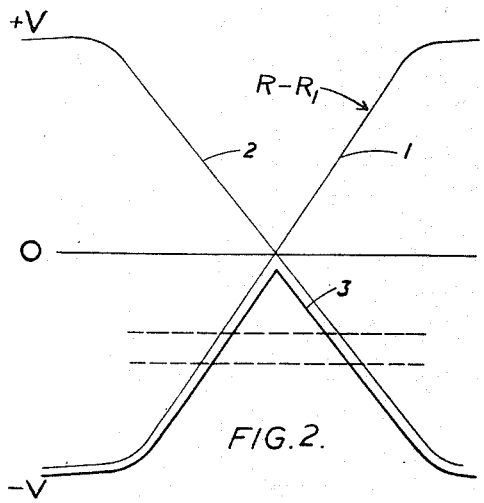
Figure 3:
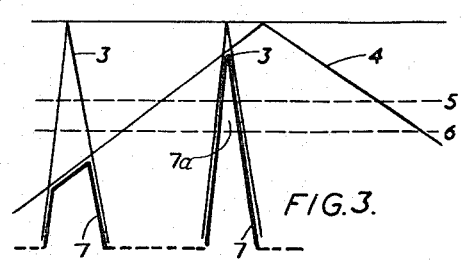

In order that the invention may be clearly understood and readily carried into effect, the invention will be described with reference to the accompanying drawings, Figure 1 illustrates diagrammatically and mainly in block form, one example of an automatic tracking circuit for radar in accordance with the present invention, the circuit employing polar co-ordinates, Figure 2 is a waveform explanatory of the operation of Figure 1, and Figure 3 is another waveform explanatory of the operation of Figure 1.

In the automatic tracking circuit shown in Figure 1, considerable portions of the channels in the co-ordinates R and $\theta$ are identical. The block diagram M represents a so-called magslip or synchro having two or more (preferably three) stator windings, and a rotor winding mounted on the shaft B of a servo motor denoted by the block SM. It will be assumed that the stator windings are electrically coupled to the corresponding stator windings of a second similar magslip, the rotor of which is mounted to rotate with the radar aerial, the coupling to the stator windings of the magslip M is represented in the drawing by the arrow $\theta$, $\theta$ representing the instantaneous bearing angle of the radar aerial and therefore the displacement of the rotor of the second or aerial magslip from a predetermined datum. Assuming that the rotor of the aerial magslip is energised with an alternating electrical voltage of fixed amplitude and angular frequency $\omega$, the output of the rotor of the magslip M is an electrical variation of the form $A \sin(\theta-\theta_1) \sin \omega t$, where $\theta_1$ is the displacement of the shaft B with respect to the datum position for the rotor of the aerial magslip. As will hereinafter appear $\theta_1$ represents the predicted angular bearing of a target which is being tracked by the tracking circuit. The magslips may be of the constuction described in the Journal of the Institution of Electrical Engineers, volume 94, part IIA, page 227. Suitable synchro constructions are described in Waveforms, volume 19 of the M. I. T. Radiation Laboratory Series, chapter 12. The output from the rotor of the magslip M is fed to a balanced demodulator which receives an input of the alternating current of angular frequency ω. The balanced demodulator may be of one of the constructions described in chapter 14 of the aforesaid Waveforms. The output of the demodulator is proportional to sin $(\theta-\theta_1)$ and is fed to detectors D1 and D2, directly in the case of the detector D1 and through a phase inverting amplifier A1 in the case of the detector D2. The phase inverting amplifier A1 is shown merely diagrammatically and is preferably a see-saw amplifier of the construction described in the Journal of the Institution of Electrical Engineers, volume 93, part IIIA, page 303. The detectors are poled as shown and are positively biassed through a resistor RL from a suitable potential source. The voltage variations set up across the resistor RL are fed to a limiting amplifier A2 which may be of any suitable known construction and whose function will be explained later. A second input to the automatic tracking circuit is fed to an amplifier A3 which is a so-called summing amplifier and is merely represented diagrammatically since it may be of the construction illustrated in Figure 18.15, page 644 of Waveforms. This second input is an electrical waveform varying linearly as R, the range scan of the radar circuit, and it is applied to A3 through one feed resistor C1 and, as will hereinafter appear, a voltage which varies linearly with $R_1$, the predicted range of the target, is applied with negative polarity to the amplifier A3 through a second feed resistor C2. The output of the amplifier A3, representing $R-R_1$ is fed to detectors D3 and D4, in the one case directly, and in the other case through a phase inverting amplifier A4, like the amplifier A1. The detectors D3 and D4 are connected to the resistor RL in the same way as D1 and D2.

In Figure 2 the waveform 1 represents a portion of the range scan R less the predicted range potential $R_1$, the amplitude of the waveform being, it is assumed, limited to a range between predetermined positive and negative voltages +V and −V by limitation in the amplifier A3. Reference 2 denotes the inverse of this waveform produced by the amplifier A4. When $R_1$ is zero, the waveform 1 lies wholly above the zero axis and the waveform 2 lies wholly below the zero axis. However, when $R_1$ is not zero as would be the case during tracking, the waveforms 1 and 2 are biassed to intersect each other on the zero axis at the time corresponding to $R_1$, the predicted range of the target, as indicated in the drawing where the zero axis is denoted by reference 8. Moreover, as $R_1$ varies, the point of intersection of the waveforms 1 and 2 with each other and with the zero axis will move to left or right to an extent depending on the magnitude and sign of the variation of $R_1$. Neglecting the detectors D1 and D2, the potential at the anodes of the detectors D3 and D4 will tend to follow the more negative of the waveforms 1 and 2 and therefore the waveform applied to the amplifier A2 will tend to have the form denoted by 3 in Figure 2, which waveform has a cusp corresponding to the zero-intersection of the waveform 1 and can be regarded as representing the modulus of the waveform 1. The waveforms applied to the detectors D1 and D2 will be similar to the waveforms 1 and 2 in the neighbourhood of the zero axis but of much smaller inclination and, neglecting D3 and D4, the waveform applied to the amplifier A2 will tend to represent the modulus of sin $(\theta-\theta_1)$, having a cusp corresponding to zero-intersection of the waveform when $\theta=\theta_1$. A portion of this waveform is represented by 4 in Figure 3 for a small range of values of $\theta-\theta_1$ near zero. The waveforms 3 and 4 have in fact no independent existence, and since $R_1$ is common to all four detectors D1 to D4 the input to the limiting amplifier A2 is the greater of the two instantaneous moduli, and this input has the waveform shown by the thickened line 7 in Figure 3. In the example illustrated, the moduli are represented by negative voltages, and consequently the input to the amplifier A2 follows the more negative voltage. It will of course be appreciated that if the moduli are represented by positive voltages, the detectors D1 to D4 would require to be arranged to follow the applied voltage having the most positive instantaneous value. The amplifier A2 is arranged to have clipping levels 5 and 6 (Figure 3) and consequently its output will consist of gating pulses which occur only during times when the cusps in the waveforms 3 and 4 coincide in the range of levels between 5 and 6. Thus, in the case of Figure 3, one gating pulse will be produced by the part 7a of the waveform 7 where it lies between the levels 5 and 6. In practice, the inclination of the sides of the cusps in the waveform 4 will be much less, relative to the waveform 3, than represented in the drawing, so that the combination of 3 and 4 will produce a series of gating pulses like 7a, in successive range scans, to produce an arc shaped window, of sufficient arc length to enclose the echo arc, together with some tolerance to allow for possible misalignment of echo and window.

The waveform sin $(\theta-\theta_1)$ also passes through zero when $(\theta-\theta_1)=180°$, and a second window will tend to be produced. However, such a second window can be inhibited by any suitable means.

The gating pulses from the amplifier A2 operate a gate G whose input consists of the echo signals received by the radar apparatus. It will be appreciated that the gating pulses from the amplifier A2 define the window of the automatic tracking channel and consequently only an echo which is enclosed by the window defined by the gating pulses is passed through the gate G. Such an echo is fed in parallel to two modulating circuits X1 and X2. The input to the modulator X1 is the waveform proportional to sin $(\theta-\theta_1)$ from the demodulator D. In the region when $\theta-\theta_1$ is nearly zero this waveform passes linearly through zero at the predicted centre of the window and its inclination is dependent upon the angular scanning frequency of the radar aerial. When no echo is transmitted through the gate to the modulator X1, there is of course no output from the modulator. When, however, an echo is received, the output of the modulator is dependent in magnitude and sign on the displacement of the echo from the time at which the waveform sin $(\theta-\theta_1)$ passes through zero. The modulator output is therefore representative of error in the prediction and is fed via a feedback amplifier to an integrating circuit S1 of known form whose output, $\dot{\theta}$, represents the rate of change of the angular bearing of the target. The output of the integrator S1 is applied by an amplifier A5 to the servo-motor SM. A tacho-generator represented by the block T is driven by the shaft B of the servo-motor, and the output of the tacho-generator, which consists of a voltage proportional to the angular velocity of the shaft B is applied as a negative feedback signal to the amplifier A5. The servo-motor therefore operates as a velodyne (see the Journal of the Institution of Electrical Engineers, volume 93, part IIIA, page 317) so that the displacement of the shaft B represents the integral of the input signal to the amplifier A5, and thus represents $\theta_1$.

The input to the modulator X2 is also a waveform which passes linearly through zero at the predicted centre of the window and whose inclination is representative of the scanning rate in the radial direction. This waveform when modulated with the gated echo produces an output representative in magnitude and sign on the displacement of the echo from the time at which the waveform $R-R_1$ passes through zero. This output is integrated by an integrating circuit S2 to produce $\dot{R_1}$ and by a second integrating circuit S3 to produce $R_1$. The resistor $r$ in the feedback path of the integrator S2 is provided to improve the stability of the integrator.

The modulating circuits X1 and X2 may be of a variety of forms and since, as aforesaid, linear multiplication is not in practice necessary the circuits X1 and X2 may simply be bidirectionally conducting switches which are normally insulating but are closed by echo signals from the gate G. A suitable form of switch is for example the switch S in Figure 1 of the specification of United States patent application Serial No. 384,520. Alternatively the modulator circuits may be in the form described in co-pending British patent specification No. 763,575. The form of modulator circuit described in said latter application consists of two valves which have their cathodes coupled together and connected to the anode of a modulating valve whose anode-to-cathode path is common to the control electrode and anode circuits of the cathode coupled valves. If this form of modulator is used the waveform to be modulated, say sin $(\theta-\theta_1)$ is applied to the control electrode of one of the cathode coupled valves, its inverse is applied to the control electrode of the other cathode coupled valve whilst the gated echo is applied to the control electrode of the modulating valve.

Although the invention has been described as applied to an automatic tracking circuit which employs polar co-ordinates, the invention can also be applied to circuits which employ Cartesian co-ordinates, where the channels for handling the different components are in any case almost alike. An application of the invention to an automatic tracking circuit which employs Cartesian co-ordinates is illustrated in co-pending British patent specification No. 763,575. Moreover, in the foregoing description, the gating pulses are timed by coincident zero-intersections of the waveforms sin $(\theta-\theta_1)$ and $R-R_1$. However, it will be understood that the timing may be determined by the intersection of the waveforms with other reference values.

What I claim is:

1. Apparatus for generating position defining pulses comprising means for generating a first electrical waveform which passes repeatedly through a predetermined reference value, at times representing one co-ordinate of a position, means for deriving a second waveform which is the inverse of said first waveform, means for generating a third electrical waveform which passes repeatedly through said reference value at times representing another co-ordinate of said position, means for deriving a fourth waveform which is the inverse of said third waveform, four unilaterally conductive paths each having an anode end and a cathode end, a load impedance connected from like ends of said paths to a point of substantially fixed potential, means for applying said first, second, third and fourth waveforms respectively to the other ends of said paths, and means for deriving position defining pulses in response to voltage variations set up across said load impedance.

2. An automatic tracking circuit for radar comprising pulse generating apparatus according to claim 1, a first modulator, means for applying one of said first and second waveforms to said first modulator, a second modulator, means for applying one of said third and fourth waveforms to said second modulator, means for gating received echo signals to said modulators in response to the output of said limiting means to produce modulation of gated echo signals by the waveforms applied to the received modulators, means for displacing said first waveform in response to the output of said first modulator to vary the times of passage through said reference value, and means for displacing said third waveform in response to the output of said second modulator to vary the times of passage through said reference value.

3. An automatic tracking circuit for radar comprising means for generating a first electrical waveform proportional to sin $(\theta-\theta_1)$ where $\theta$ is the bearing angle of the radar beam and $\theta_1$ is the predicted azimuth of an echo, means for deriving a second waveform which is the inverse of said first waveform, means for deriving a third waveform proportional to $(R-R_1)$ where R is the range scan of the radar beam and $R_1$ is the predicted range of said echo, means for deriving a fourth waveform which is the inverse of said third waveform, four unilaterally conductive paths each having an anode end and a cathode end, a loaded impedance connected from like ends of said paths to a point of substantially fixed potential, means for applying said first, second, third and fourth waveforms respectively to the other ends of said paths, means for limiting voltage variations set up across said load impedance to derive gating pulses, a first modulator, means for applying one of said first and second waveforms to said first modulator, a second modulator, means for applying one of said third and fourth waveforms to said second modulator, means for gating received echo signals to said modulators in response to said gating pulses to produce modulation of the gated echo signal by the waveforms applied to the respective modulators, means responsive to the output of the first modulator for displacing said first waveform corresponding to a variation of $\theta_1$, and means responsive to the output of said second modulator for displacing said third waveform corresponding to a variation of $R_1$.

References Cited in the file of this patent

UNITED STATES PATENTS

| | | |
|---|---|---|
| 2,534,862 | Fox | Dec. 19, 1950 |
| 2,561,475 | Jacobsen | July 24, 1951 |
| 2,571,017 | Dempsey et al. | Oct. 9, 1951 |
| 2,590,514 | Dehm et al. | Mar. 25, 1952 |
| 2,685,049 | Steinberg | July 27, 1954 |